(12) United States Patent
Hercz et al.

(10) Patent No.: US 12,001,817 B1
(45) Date of Patent: Jun. 4, 2024

(54) SYSTEM, METHOD, AND COMPUTER PROGRAM FOR MANAGING NAVIGATIONAL FLOWS BETWEEN APPLICATION PAGES

(71) Applicant: Amdocs Development Limited, Limassol (CY)

(72) Inventors: Roni Hercz, Kfar Saba (IL); Kevin Charlot, Tel Aviv (IL); Itai Jacobson, Rehovot (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 100 days.

(21) Appl. No.: 17/724,389

(22) Filed: Apr. 19, 2022

(51) Int. Cl.
*G06F 8/34* (2018.01)
*G06F 8/38* (2018.01)
*G06F 8/65* (2018.01)

(52) U.S. Cl.
CPC .................. *G06F 8/34* (2013.01); *G06F 8/38* (2013.01); *G06F 8/65* (2013.01)

(58) Field of Classification Search
CPC .................. G06F 8/34; G06F 8/38; G06F 8/65
USPC .................................................. 717/104–135
See application file for complete search history.

(56) References Cited

U.S. PATENT DOCUMENTS

| | | | | |
|---|---|---|---|---|
| 6,671,692 B1* | 12/2003 | Marpe | ..................... | G06F 16/954 715/761 |
| 7,818,663 B2* | 10/2010 | Khaba | ..................... | G06F 40/166 715/255 |
| 8,005,795 B2* | 8/2011 | Galipeau | ............... | G06F 16/221 707/648 |
| 8,505,025 B2* | 8/2013 | Nakamura | .......... | G06F 9/44521 709/224 |
| 8,606,588 B1* | 12/2013 | Marpe | ................ | G06Q 10/0637 705/311 |
| 10,795,799 B2* | 10/2020 | Lipka | ....................... | G06F 40/51 |
| 2014/0229898 A1* | 8/2014 | Terwedo | ............... | G06F 3/0482 715/835 |
| 2018/0314688 A1* | 11/2018 | Snitko | ..................... | G06F 9/454 |

OTHER PUBLICATIONS

Upson, Craig, et al. "The application visualization system: A computational environment for scientific visualization." IEEE Computer Graphics and Applications 9.4 (1989): pp. 30-42. (Year: 1989).*
Kreylos, Oliver. "Environment-independent VR development." International Symposium on Visual Computing. Berlin, Heidelberg: Springer Berlin Heidelberg, 2008.pp. 1-12 (Year: 2008).*
Bianchi, Antonio, et al. "What the app is that? deception and countermeasures in the android user interface." 2015 IEEE Symposium on Security and Privacy. IEEE, 2015.pp. 931-948 (Year: 2015).*

(Continued)

*Primary Examiner* — Satish Rampuria
(74) *Attorney, Agent, or Firm* — Zilka-Kotab, P.C.

(57) ABSTRACT

As described herein, a system, method, and computer program are provided for managing a navigational flow of an application. A navigational flow defined for a plurality of user interfaces of an application is determined. The navigational flow is rendered in an editing tool. An update to the navigational flow is received, via the editing tool. The update is automatically translated into code of the application.

17 Claims, 8 Drawing Sheets

(56) References Cited

OTHER PUBLICATIONS

Heninger, Kathryn L. "Specifying software requirements for complex systems: New techniques and their application." IEEE Transactions on Software Engineering 1 (1980): pp. 2-13. (Year: 1980).*
Oreizy, Peyman, et al. "An architecture-based approach to self-adaptive software." IEEE Intelligent Systems and Their Applications 14.3 (1999): pp. 54-62. (Year: 1999).*
Stonebraker, Michael, and Greg Kemnitz. "The POSTGRES next generation database management system." Communications of the ACM 34. 10 (1991): pp. 78-92. (Year: 1991).*
Sheehan, M., "Building a Low Code Process in Creatio," Technology Advisors, YouTube Video, Oct. 30, 2020, 2 pages, retrieved from https://www.youtube.com/watch?v=fbj5mv01kJY&t=1383s.
Outsystems, "Create workflow apps with Workflow Builder," Outsystems Community, Apr. 18, 2022, 6 pages, retrieved from https://success.outsystems.com/Documentation/11/Developing_an_Application/Create_case_management_and_workflow_apps/Create_workflow_apps_with_Workflow_Builder.
Outsystems, "Creating a Workflow Builder app," Outsystems Community, Apr. 18, 2022, 7 pages, retrieved from https://success.outsystems.com/Documentation/11/Developing_an_Application/Create_case_management_and_workflow_apps/Create_workflow_apps_with_Workflow_Builder/Using_Workflow_Builder/Creating_a_Workflow_Builder_app.
Mendix, "Workflows," Mendix Technology, Apr. 12, 2022, 7 pages, retrieved from https://docs.mendix.com/studio/workflows/.
Mendix, "Microflows," Mendix Technology, Mar. 30, 2022, 9 pages, retrieved from https://docs.mendix.com/studio/microflows/.
Servicenow, "Getting Started with the Now Platform," servicenow, 2022, 5 pages, retrieved from https://developer.servicenow.com/dev.do#!/guides/rome/now-platform/now-platform-guide/now-platform-guide-intro.
Servicenow, "No-Code Citizen Developer Guide for the Now Platform, Introduction," servicenow, 2022, 2 pages, retrieved from https://developer.servicenow.com/dev.do#!/guides/sandiego/now-platform/citizen-dev-guide/citizen-dev-intro.
Servicenow, "No-Code Citizen Developer Guide for the Now Platform, Logic," servicenow, 2022, 5 pages, retrieved from https://developer.servicenow.com/dev.do#!/guides/sandiego/now-platform/citizen-dev-guide/cd-logic.
Servicenow, "Flow Designer," servicenow, 2022, 2 pages, retrieved from https://developer.servicenow.com/dev.do#!/learn/courses/sandiego/app_store_learnv2_flowdesigner_sandiego_flow_designer.
Bubble, "Build any web app with no code," .bubble, 2022, 5 pages, retrieved from https://bubble.io/features.
Appian, "Process Model Object," Appian, 2022, 24 pages, retrieved from https://docs.appian.com/suite/help/21.4/process-model-object.html.
Pega, "One powerful low-code multiexperience development platform," Pegasystems Inc., 2022, 7 pages, retrieved from https://www.pega.com/products/platform/multiexperience.
Pega, "How to Build an App in Minutes with No Code," Pegasystems Inc., 2022, 9 pages, retrieved from https://www.pega.com/insights/resources/how-build-app-minutes-no-code.

* cited by examiner

SYSTEM, METHOD, AND COMPUTER PROGRAM FOR MANAGING NAVIGATIONAL FLOWS BETWEEN APPLICATION PAGES

FIELD OF THE INVENTION

The present invention relates to navigational flows in computer applications.

BACKGROUND

User-interface based applications, including online (e.g. web) applications, usually include defined flows between the different pages (i.e. user interfaces) of the application. Typically, these flow are defined by drawing the flows on paper or in software. However, in any case, current techniques do not allow the drawn flows to be automatically translated to computer code that is a part of the application. Instead, manual programming is required to incorporate the flows into the application, which increases development time of the application and which is prone to user-generated error.

There is thus a need for addressing these and/or other issues associated with the prior art.

SUMMARY

As described herein, a system, method, and computer program are provided for managing a navigational flow of an application. A navigational flow defined for a plurality of user interfaces of an application is determined. The navigational flow is rendered in an editing tool. An update to the navigational flow is received, via the editing tool. The update is automatically translated into code of the application.

DETAILED DESCRIPTION

Figure 1:
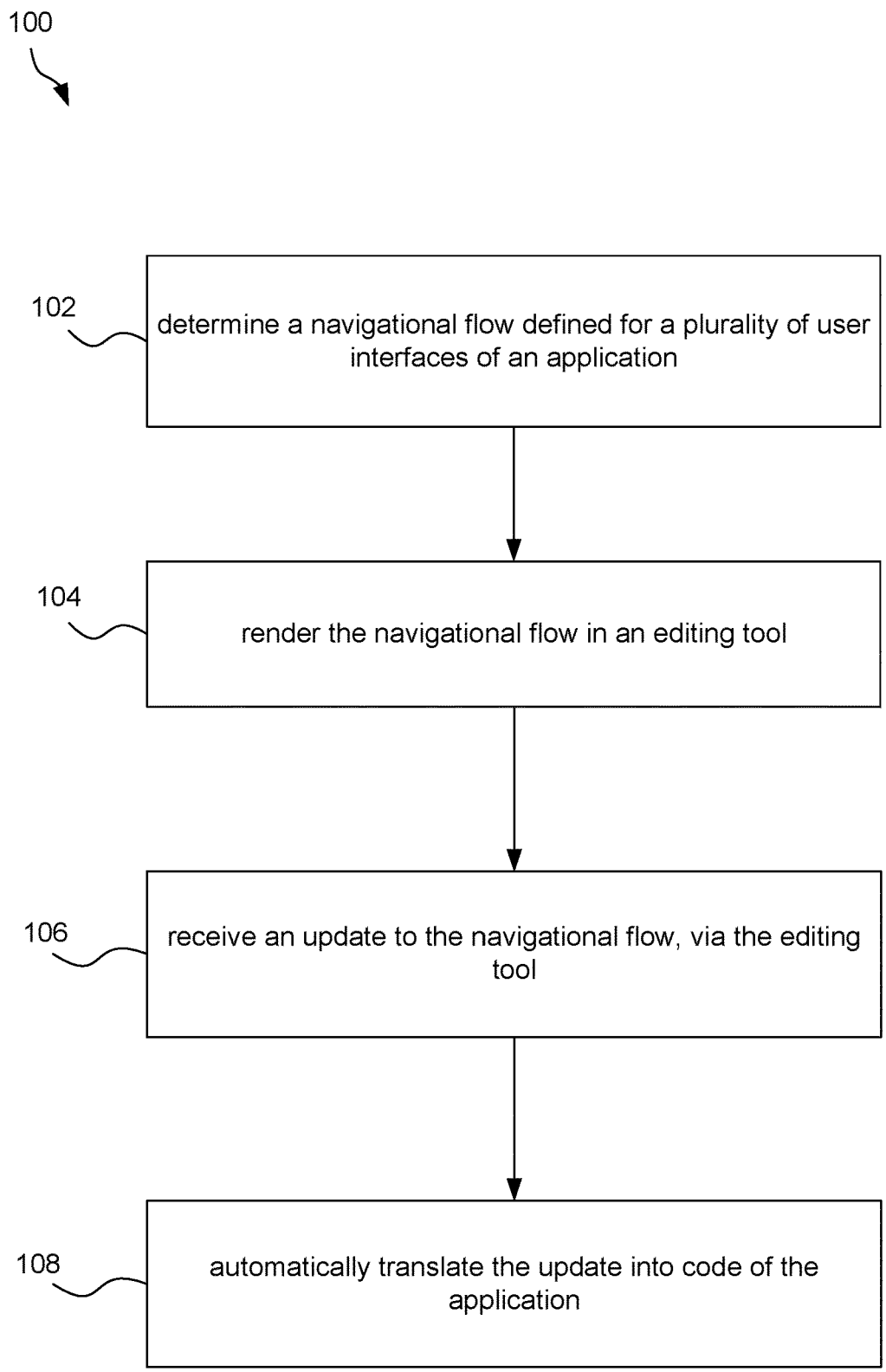
FIG. 1 illustrates a method for managing a navigational flow of an application, in accordance with one embodiment.

FIG. 1 illustrates a method 100 for managing a navigational flow of an application, in accordance with one embodiment. The method 100 may be performed by any computer system(s) described below with respect to FIGS. 6 and/or 7. In one example described herein, the method 100 may be performed by a computer system used for developing an application.

In the context of the present description, an application refers to any computer program that is configured to perform one or more specific functions for an end user and that is configured to include a navigational flow involving a plurality of user interfaces. For example, the application may include a plurality of features such as the user interfaces, functions, libraries, application programming interfaces (APIs), etc. A navigational flow refers to a flow (i.e. order) across user interfaces (e.g. pages or any other user interface elements), which can be navigated by a user of the application. The navigational flow is generally defined in code of the application, and includes the user interfaces and flow among the user interfaces. While "pages" may be referred to in some embodiments of the present description, it should be noted that these embodiments may equally apply to other types of user interface elements of the application for which a flow can be defined.

In an embodiment, the application may be an online (i.e. web) application. In this case, the navigational flow may be a flow across pages of the web application that can be navigated by a user. As described below, the pages of the web application and the navigational flow across such pages may be defined in Json files which store metadata of all the pages within the boundaries of the application.

The application may execute on a server, such as a server in the cloud. This server-based execution may especially be the case where the application is a web application that is accessible to remote users via one or more networks.

In operation 102, the navigational flow defined for the plurality of user interfaces of the application is determined. For example, the navigational flow may be a flow between at least two user interfaces (e.g. pages) of the application. In an embodiment, the navigational flow may be determined by analyzing the application. For example, the navigational flow may be determined by analyzing the code of the application.

In an embodiment mentioned above where the user interfaces of the application and the navigational flow across such user interfaces is defined in Json files, the navigational flow may be determined by parsing metadata associated with the user interfaces (e.g. metadata of the pages within the boundaries of the application). The metadata may be parsed for navigational information defining the navigational flow. In an embodiment, the navigational information may be added to a common map, for use as described below.

In operation 104, the navigational flow is rendered in an editing tool. Rendering the navigational flow refers to displaying a representation of the navigational flow in the editing tool for viewing by a user. The editing tool refers to any user interface-based tool that allows a user to edit the navigational flow, as described in more detail below. For example, the editing tool may render the navigational flow on a "canvas" that allows the user to make changes to the navigational flow.

The user interfaces within the navigational flow may be rendered as some type of predefined object (e.g. a rectangle), which may each be labeled with a name or other identifier of the corresponding user interface. The flow between the user interfaces may be rendered as lines with arrows, or some other type of indicator, to show the order within the flow from one user interface to another.

In an embodiment, the navigational flow may be rendered by rendering the common map generated as described above. The common map may be rendered by an open source React flow library, for example.

As an optional embodiment, when the navigational flow includes a conditional sub-flow (i.e. a flow within the navigational flow that only occurs upon some prompt by a user or upon some trigger preconfigured by a rule), the conditional sub-flow may be rendered when rendering the navigational flow. With respect to this embodiment, a condition of the conditional sub-flow may be rendered as a user-selectable option. This may allow the conditional sub-flow to be rendered upon selection by the user of the user-selectable option. This may also allow the conditional sub-flow to be hidden (i.e. not rendered) when the user-selectable option is not selected by the user.

In operation 106, an update to the navigational flow is received, via the editing tool. The update may be any change to the user interfaces and/or flow between the user interfaces. As mentioned above, the editing tool may include a "canvas" on which the user can make the change to the navigational flow. For example, the editing tool may include functionality allowing the user to draw new user interfaces to include in the navigational flow, to remove user interfaces from the navigational flow, to draw new flows (i.e. links) between user interfaces of the navigational flow, to remove flows between user interfaces of the navigational flow, etc.

In an embodiment, the update may include adding a new user interface and linking the new user interface to the navigational flow. For example, the new user interface may be added from a library of available (template) user interfaces. In another embodiment, the update may include removing an existing user interface from the navigational flow and removing an existing link to the existing user interface from the navigational flow. In yet another embodiment, the update may include changing an existing flow between user interfaces in the navigational flow.

In operation 108, the update is automatically translated into code of the application. The translation may be performed by a process configured to translate the rendered navigational flow to code of the application. The process may be performed by a computer system, thus allowing the translation to occur automatically.

In one embodiment, this automatic translation may be performed by generating an array of objects which contains an identifier of each of the user interfaces affected by the update and information defining the update (i.e. information defining the change being made), and then providing the array of objects to a service that applies the update to the code of the application. For example, the update may be applied to the above mentioned metadata associated with the user interfaces.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
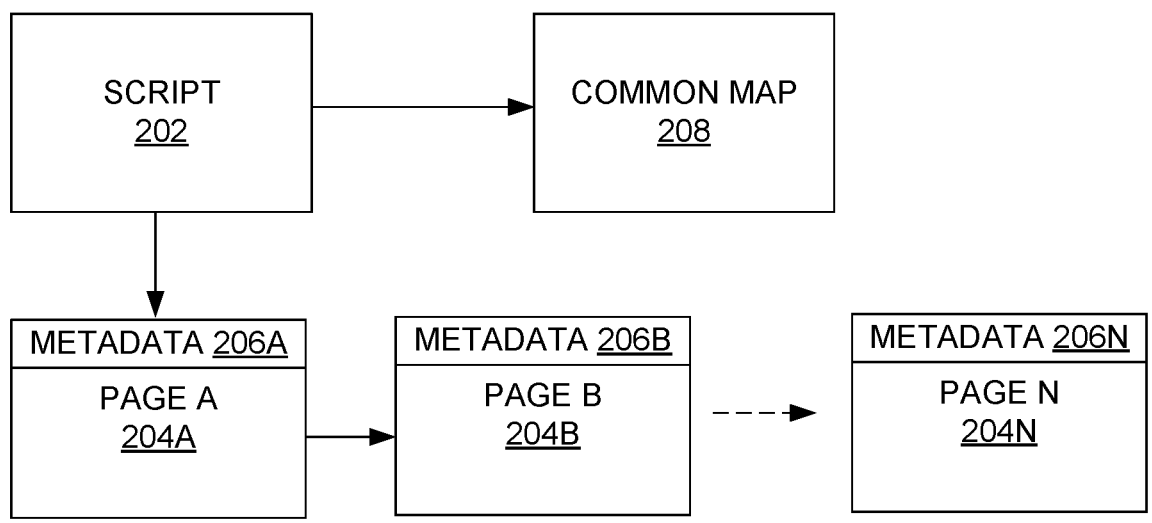
FIG. 2 illustrates a flow diagram for determining a navigational flow for an application, in accordance with one embodiment.

FIG. 2 illustrates a flow diagram for determining a navigational flow for an application, in accordance with one embodiment. As an option, the flow diagram may be implemented in the context of the details of the previous figure and/or any subsequent figure(s). Of course, however, the flow diagram may be implemented in the context of any desired environment. Further, the aforementioned definitions may equally apply to the description below.

As shown, a script 202 performs a recursive parsing of Json files which store metadata 206A-N of all the pages 204A-N within the boundaries of a given application, and reads through the files to retrieve navigational information. This navigational information is then added to a common map 208 which is then rendered on screen by an open source React flow library.

Figure 3A:
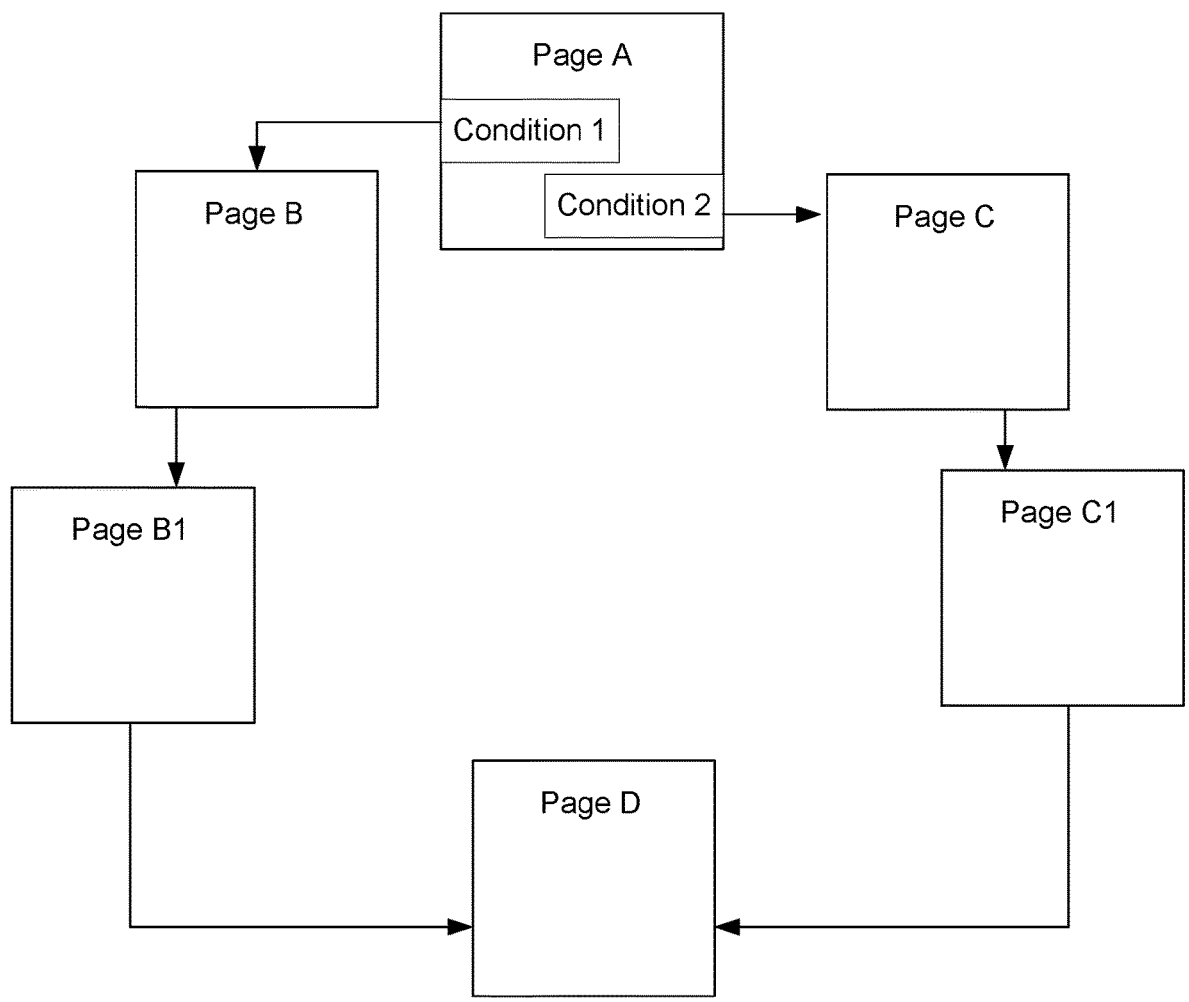
FIG. 3A illustrates a flow diagram for rendering a conditional sub-flow of a navigational flow of an application, in accordance with one embodiment.

FIG. 3A illustrates a flow diagram for rendering a conditional sub-flow of a navigational flow of an application, in accordance with one embodiment. As an option, the flow diagram may be implemented in the context of the details of the previous figure and/or any subsequent figure(s). Of course, however, the flow diagram may be implemented in the context of any desired environment. Further, the aforementioned definitions may equally apply to the description below.

Any single page may contain in its metadata navigational information that is conditional based on a rule. The script (e.g. item 202 of FIG. 2) will include this information in the common map and render the conditional flows as well in the editing tool.

For example, the present embodiment shows a navigational flow that has been rendered. The navigational flow includes two conditional sub-flows originating at (extending from) Page A. In operation, the application will navigate a first sub-flow (from Page A to Page B to Page B1) when "condition 1" is triggered (e.g. selected by a user or determined by some defined rule), and likewise the application will navigate a second sub-flow (from Page A to Page C to Page C1) when "condition 2" is triggered (e.g. selected by a user or determined by some defined rule).

A condition of each conditional sub-flow (i.e. "condition 1" and "condition 2") may be rendered as a user-selectable option, as described in more detail below with reference to FIG. 3B. In the present embodiment, and by way of example only, the conditions for the first and second sub-flows are selectable or determinable, as described above, in the alternative.

Figure 3B:
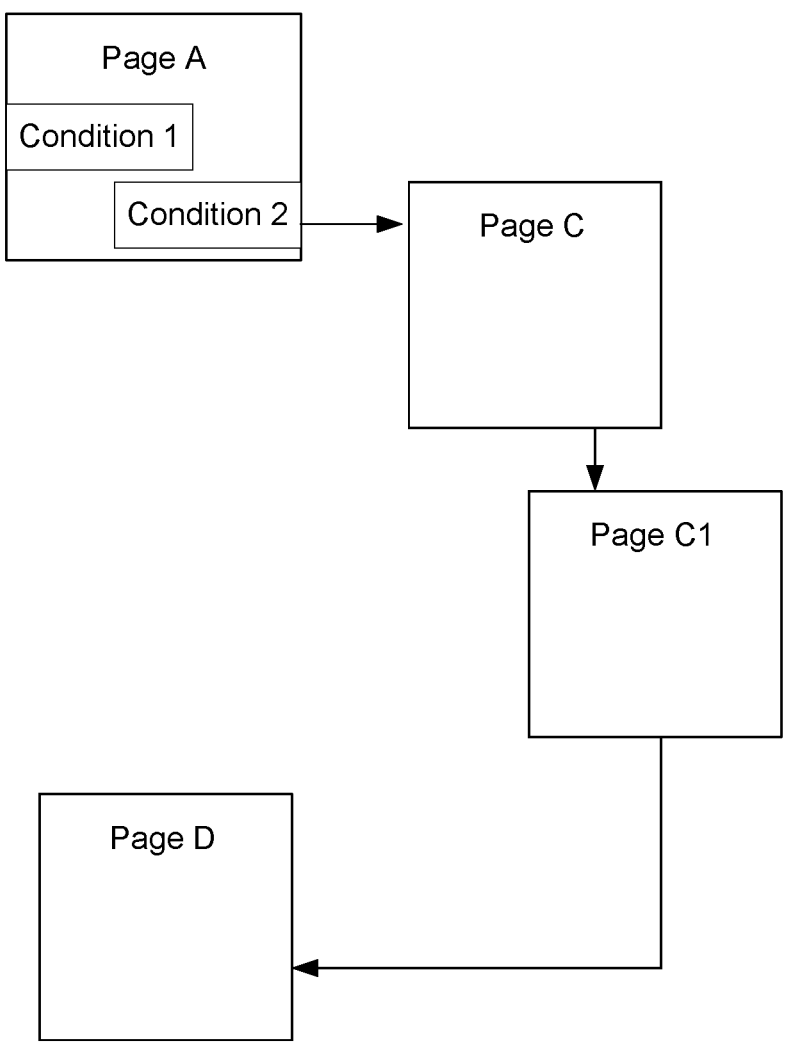
FIG. 3B illustrates a flow diagram for rendering only a user-selected conditional sub-flow, in accordance with one embodiment.

FIG. 3B illustrates a flow diagram for rendering only a user-selected conditional sub-flow, in accordance with one embodiment. While "user-selected" is mentioned here, it should be noted that the flow diagram may equally apply to a conditional sub-flow that is determined based upon a rule. As an option, the flow diagram may be implemented in the context of the details of the previous figure and/or any subsequent figure(s). Of course, however, the flow diagram may be implemented in the context of any desired environment. Further, the aforementioned definitions may equally apply to the description below.

When a condition of a conditional sub-flow is rendered in the editing tool, as described above with reference to FIG. 3A, the condition is user-selectable to allow a user to choose between viewing and hiding the sub-flow in the editing tool. In the example shown, the user has selected "condition 2" and thereby the editing tool renders the sub-flow associated with "condition 2," and the editing tool hides the sub-flow associated with "condition 1" which has not been selected. A sub-flow may be hidden from the rendered navigational flow by hiding the navigational data for the non-selected sub-flow from the React flow library which otherwise renders from the common map.

Figure 4:
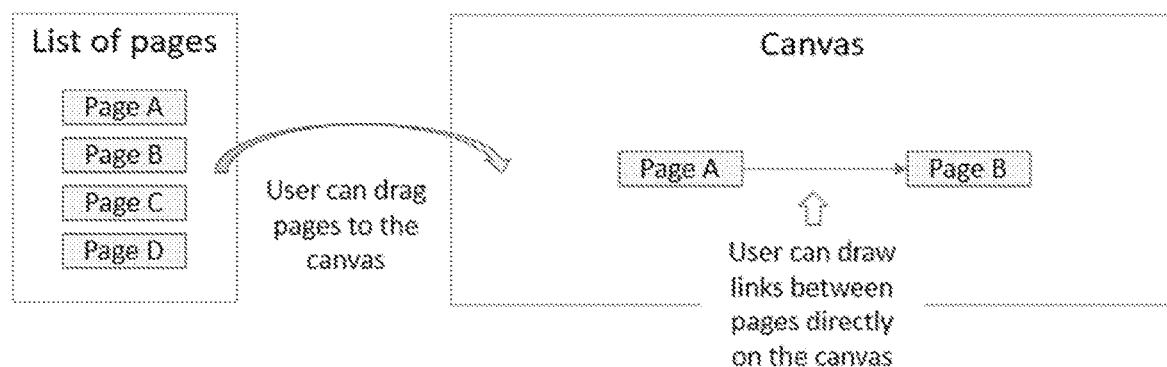
FIG. 4 illustrates a flow diagram for adding a page to a navigational flow of an application and removing a page from a navigational flow of an application, in accordance with one embodiment.
Figure 4:
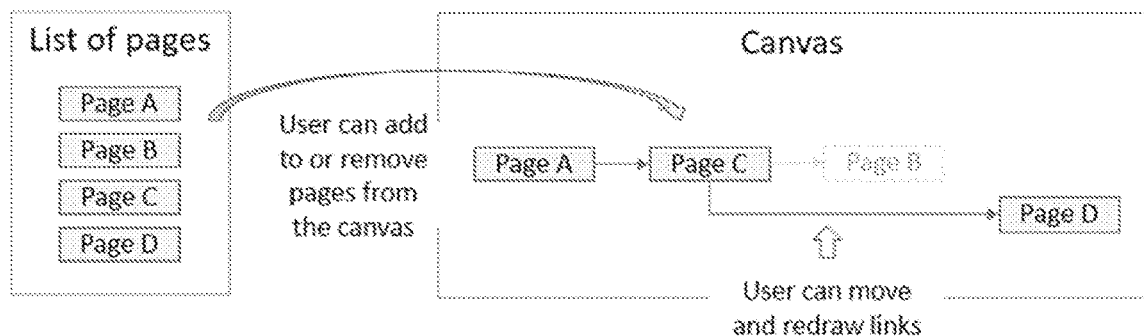

FIG. 4 illustrates a flow diagram for adding a page to a navigational flow of an application and removing a page from a navigational flow of an application, in accordance with one embodiment. As an option, the flow diagram may be implemented in the context of the details of the previous figure and/or any subsequent figure(s). Of course, however, the flow diagram may be implemented in the context of any desired environment. Further, the aforementioned definitions may equally apply to the description below.

Using the editing tool, a user can build a flow on an empty canvas of the editing tool, or can change a navigational flow rendered on the canvas. The editing tools allows the user to add pages to the canvas and then link them to each other. The user can add any page from the page library and create links between them. The user can also remove pages and change links that are drawn between the pages on the canvas.

Figure 5:
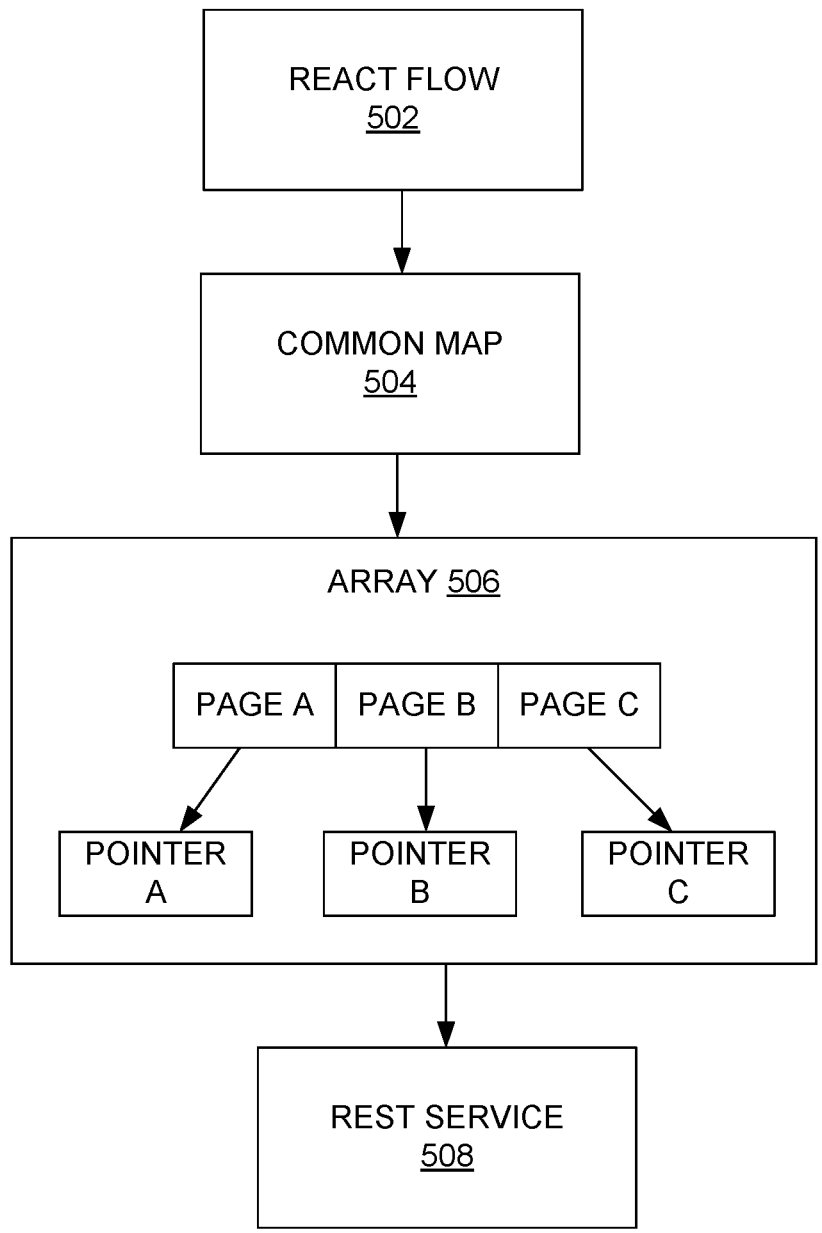
FIG. 5 illustrates a flow diagram for updating a navigational flow of an application, in accordance with one embodiment.

FIG. 5 illustrates a flow diagram for updating a navigational flow of an application, in accordance with one embodiment. As an option, the flow diagram may be implemented in the context of the details of the previous figure and/or any subsequent figure(s). Of course, however, the flow diagram may be implemented in the context of any desired environment. Further, the aforementioned definitions may equally apply to the description below.

When pages are added to the canvas and links are drawn between them in the React F\flow 502 and saved, the data is stored in a common map 504 and the system sends an array of objects 506 which contains the page identifier (ID) that to be edited in the application and the new flow to a rest service 508 on the server. The rest service 508 will then edit and update the metadata in the Json files with the new navigational information of all the pages in a single transaction, and the new or updated navigational flow is stored. When the application is subsequently executed, the new/updated navigational flow will be used.

Figure 6:
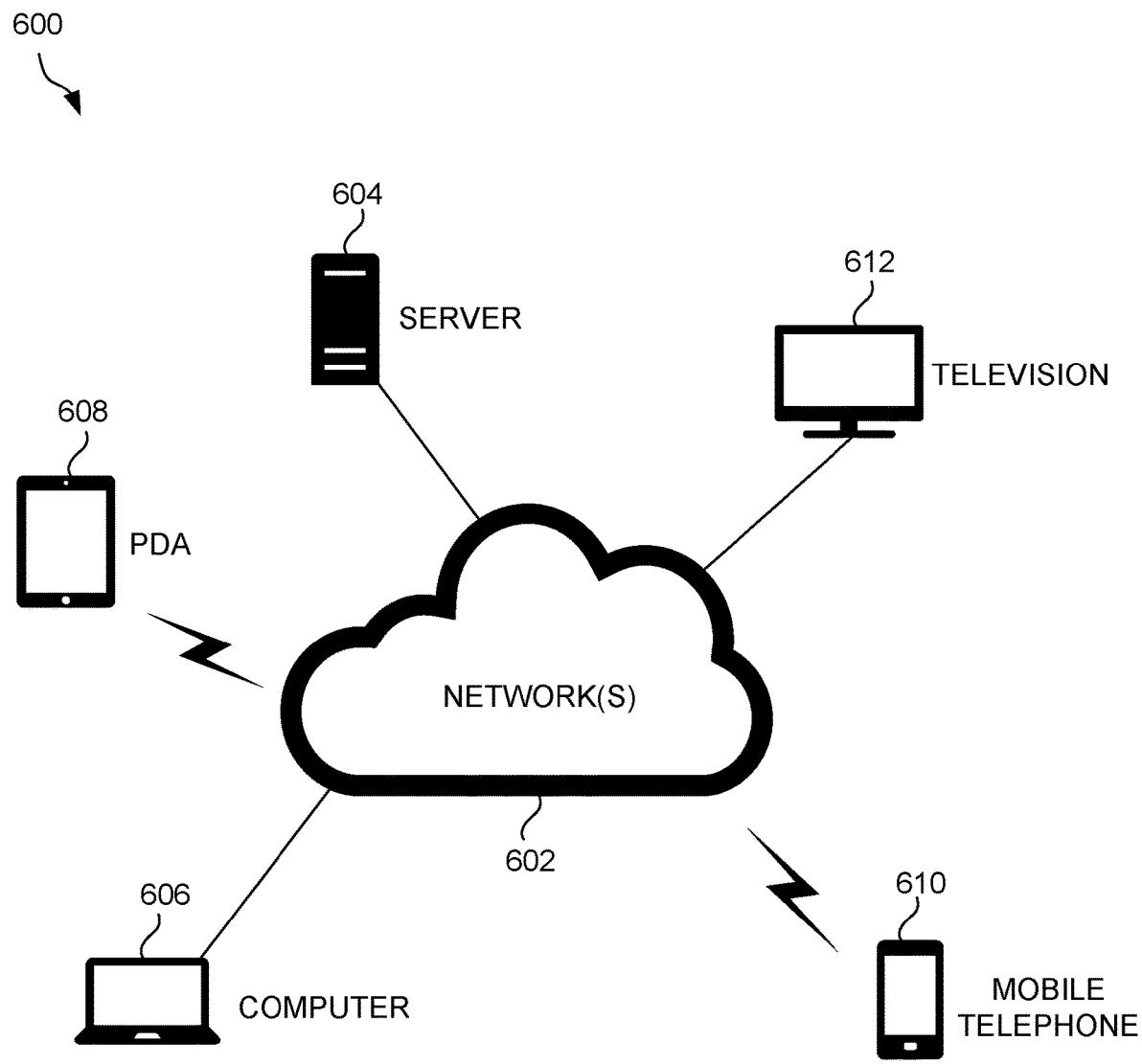
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
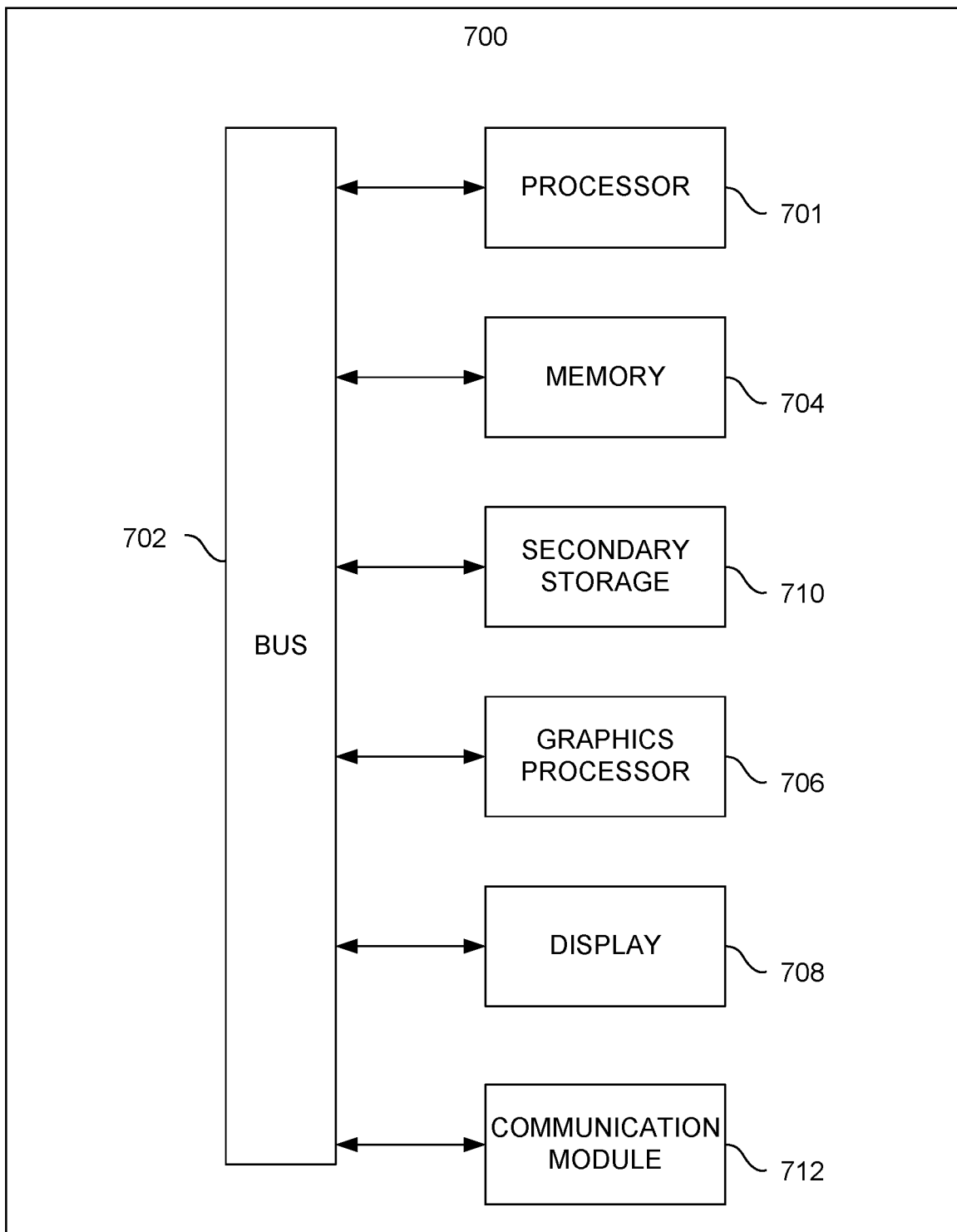
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

The system 700 may also include one or more communication modules 712. The communication module 712 may be operable to facilitate communication between the system 700 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
    determine a navigational flow defined for a plurality of user interfaces of an application by parsing metadata associated with the plurality of user interfaces for navigational information defining the navigational flow;
    add the navigational information to a common map;
    render the navigational flow in an editing tool by rendering the common map by an open source React flow library;
    receive an update to the navigational flow, via the editing tool; and
    automatically translate the update into code of the application.

2. The non-transitory computer-readable media of claim 1, wherein the application is a web application.

3. The non-transitory computer-readable media of claim 1, wherein the plurality of user interfaces are pages of the application.

4. The non-transitory computer-readable media of claim 1, wherein the navigational flow is defined in code of the application.

5. The non-transitory computer-readable media of claim 1, wherein the navigational flow is determined by analyzing the application.

6. The non-transitory computer-readable media of claim 1, further comprising:
    when the navigational flow includes a conditional sub-flow, rendering the conditional sub-flow when rendering the navigational flow.

7. The non-transitory computer-readable media of claim 6, wherein a condition of the conditional sub-flow is rendered as a user-selectable option.

8. The non-transitory computer-readable media of claim 7, wherein the conditional sub-flow is rendered upon selection of the user-selectable option.

9. The non-transitory computer-readable media of claim 7, wherein the conditional sub-flow is hidden when the user-selectable option is not selected.

10. The non-transitory computer-readable media of claim 1, wherein the update includes adding a new user interface to the plurality of user interfaces and linking the new user interface to the navigational flow.

11. The non-transitory computer-readable media of claim 10, wherein the new user interface is added from a library of available user interfaces.

12. The non-transitory computer-readable media of claim 1, wherein the update includes removing an existing user interface of the plurality of user interfaces from the navigational flow and removing an existing link to the existing user interface from the navigational flow.

13. The non-transitory computer-readable media of claim 1, wherein the update includes changing an existing link between two user interfaces of the plurality of user interfaces in the navigational flow.

14. The non-transitory computer-readable media of claim 1, wherein automatically translating the update into the code of the application includes:

generating an array of objects which contains an identifier of each user interface of the plurality of user interfaces affected by the update and information defining the update, and providing the array of objects to a service that applies the update to the code of the application.

15. The non-transitory computer-readable media of claim 1, wherein automatically translating the update into the code of the application includes:

applying the update to metadata associated with the plurality of user interfaces.

16. A method, comprising:

at a computer system:

determining a navigational flow defined for a plurality of user interfaces of an application;

rendering the navigational flow in an editing tool;

receiving an update to the navigational flow, via the editing tool; and automatically translating the update into code of the application, including:

generating an array of objects which contains an identifier of each user interface of the plurality of user interfaces affected by the update and information defining the update, and providing the array of objects to a service that applies the update to the code of the application.

17. A system, comprising:

a non-transitory memory storing instructions; and one or more processors in communication with the non-transitory memory that execute the instructions to:

determine a navigational flow defined for a plurality of user interfaces of an application;

render the navigational flow in an editing tool;

receive an update to the navigational flow, via the editing tool; and automatically translate the update into code of the application, including:

generating an array of objects which contains an identifier of each user interface of the plurality of user interfaces affected by the update and information defining the update, and providing the array of objects to a service that applies the update to the code of the application.

* * * * *